G. W. SPONABLE.
CHUCK FOR HOLDING AND CENTERING GEARS.
APPLICATION FILED MAR. 2, 1908.
1,021,011.
Patented Mar. 26, 1912.
2 SHEETS—SHEET 1.
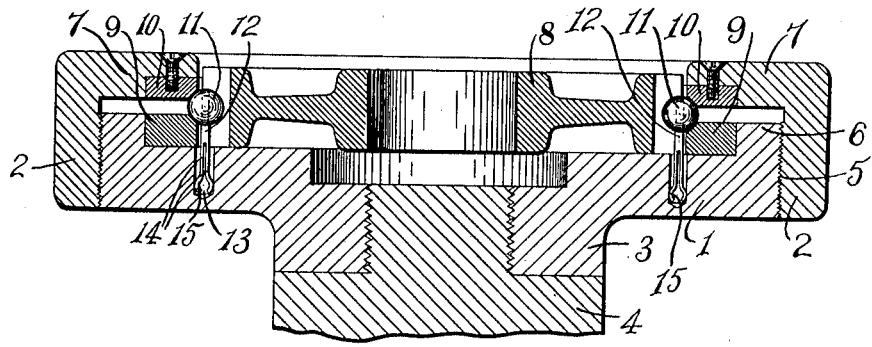
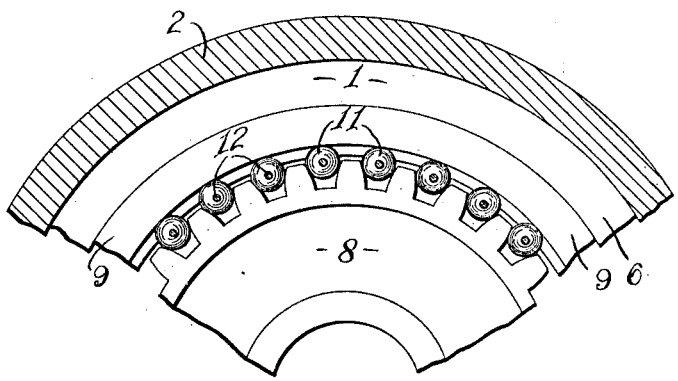
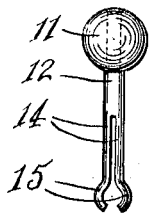
WITNESSES:
INVENTOR
ATTORNEYS G. W. SPONABLE.
CHUCK FOR HOLDING AND CENTERING GEARS.
APPLICATION FILED MAR. 2, 1908.
1,021,011.
Patented Mar. 26, 1912.
2 SHEETS—SHEET 2.
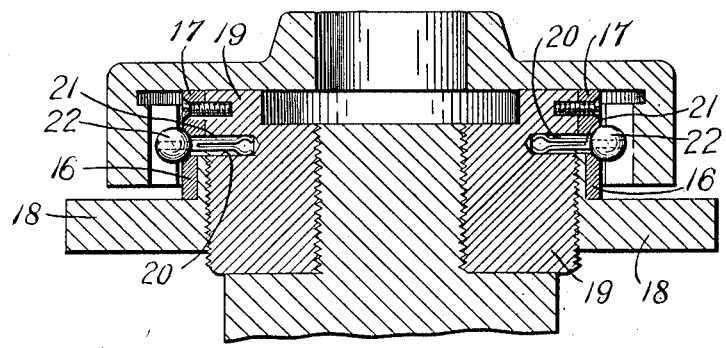
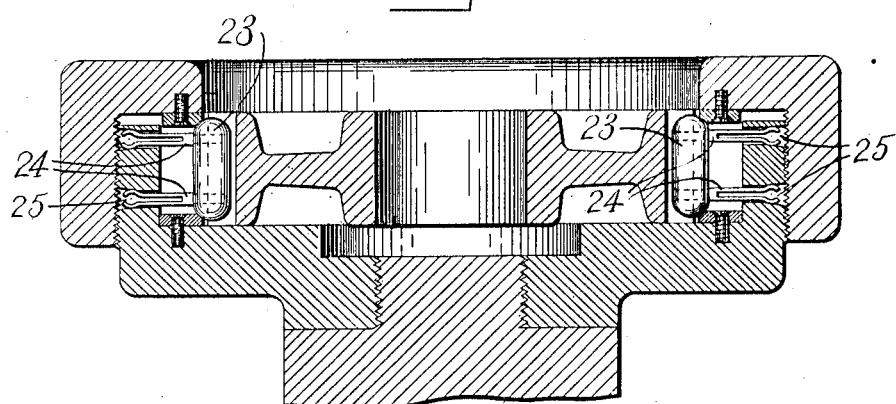

UNITED STATES PATENT OFFICE.

GEORGE W. SPONABLE, OF SYRACUSE, NEW YORK, ASSIGNOR TO THE BROWN-LIPE GEAR COMPANY, OF SYRACUSE, NEW YORK, A CORPORATION OF NEW YORK.

CHUCK FOR HOLDING AND CENTERING GEARS.

1,021,011.  Specification of Letters Patent.  Patented Mar. 26, 1912.

Application filed March 2, 1908.  Serial No. 418,696.

*To all whom it may concern:*

Be it known that I, GEORGE W. SPONABLE, of Syracuse, in the county of Onondaga and State of New York, have invented a certain new and useful Chuck for Holding and Centering Gears, of which the following is a specification.

My invention has for its object the production of a chuck for centering and holding gears, which is particularly simple in construction and highly efficient in use; and it consists in the combinations and constructions hereinafter set forth and claimed.

In describing this invention reference is had to the accompanying drawing in which like characters designate corresponding parts in all the views.

Figure 1 is a sectional view of one form of my chuck. Fig. 2 is a face view thereof, partly broken away and partly in section. Fig. 3 is a detail view of one of the clamping members and the support therefor. Figs. 4 and 5 are views similar to Fig. 1 of other embodiments of my invention.

This chuck comprises, generally, independently-movable clamping members for entering spaces between teeth of the gear to be centered and held, and means for simultaneously forcing the clamping members into engagement with opposing faces of said teeth.

As illustrated, my chuck comprises a body having means for securement to a suitable support as the spindle of a machine tool, and clamping members carried by the body and arranged in circular series, said members being movable radially and circumferentially relatively to the gear held by the chuck, and said body comprising two relatively-movable elements having bearing faces for forcing the clamping members into operative engagement.

1 and 2 are the two elements of the body, the element 1 being disk-shaped and formed with an internally-threaded hub 3 for receiving the externally-threaded end of a spindle 4, and also having a threaded periphery 5 and an annular flange 6 projecting from one end of said part 1; and the element 2 being an internally-threaded collar turning on the threaded periphery of the element 1 and formed with an inwardly-extending annular flange 7 opposed to the edge of the flange 6 of the element 1. Said flanges 6 and 7 form the circular wall of a recess in which the gear 8 to be operated upon, is supported. These elements 1 and 2 of the body are preferably formed with annular bearing pieces 9 and 10 having diverging or oppositely-inclined faces for engaging the clamping members, which are usually balls 11. As is obvious, when the collar or element 2 is turned on the periphery of the disk-shaped element in one direction, it moves axially carrying the inclined face of the bearing piece 10 toward the inclined face of the bearing piece 9, and thereby forcing the balls 11 radially relatively to the gear 8. Thus the element 2 constitutes means common to all of the clamping members 11 for forcing the same radially into operative engagement with opposing faces.

The clamping members 11 are arranged in circular series, and are preferably supported by yielding or resilient means as spring stems 12, having corresponding ends arranged in a circular series of sockets 13 extending inwardly from an end face of the element 1 of the body, and substantially parallel to the axis of the chuck, the outer ends of said stems extending through openings in the members 11. Each stem 12 is here shown as provided with a forked end consisting of opposite spring arms 14, the extremities of which are expanded outwardly at 15 and slidably engage the walls of the corresponding socket 13, so that the stems 12 may move endwise in the sockets. These stems 12 permit the clamping members 11 to move radially relatively to the axis of the chuck and also circumferentially relatively to the gear 8, that is in a direction at an angle to the direction of the radial movement of said members 11.

In Fig. 4, my chuck is shown adapted for holding annular gears, the chuck in this embodiment of my invention having outwardly-facing bearing pieces 16 and 17 provided, respectively, on a disk-shaped element 18, and a collar 19 movable on the periphery of the disk-shaped element. The sockets 20, in which are located the stems 21 of the clamping members 22, are arranged radially relatively to the axis of the element 18, instead of parallel thereto.

In Fig. 5, my chuck is shown as provided with a modified form of the clamping members, each of such members consisting of an elongated piece as a roller 23, which is supported at its ends by stems 24 having their forked ends arranged in sockets 25 disposed radially relatively to the axis of the chuck.

In the operation of my chuck, the movable collar is detached from the disk-shaped element of the body to permit the gear to be placed in position and the clamping members to enter the spaces between teeth of said gear and loosely engage opposing faces of said teeth, the clamping members moving to a limtied extent circumferentially relatively to the gear in order to adjust themselves to the positions of said spaces. The movable collar is then placed in position and turned on the disk-shaped element thus forcing the clamping members radially to center and rigidly hold the gear in the chuck.

What I claim is:—

1. In a chuck for centering and holding gears, clamping members for entering between and engaging opposing faces of teeth of the gear held by the chuck, the clamping members being spaced apart and movable radially relatively to the axis of the chuck and also at an angle to the direction of their radial movement, means for supporting the clamping members and maintaining their relative positions to each other and means for simultaneously forcing the clamping members radially, substantially as and for the purpose set forth.

2. In a chuck for centering and holding gears, a body having a gear-receiving recess, independently movable clamping members, means for holding said members in their initial position with portions thereof projecting into said recess in position to enter the spaces between the teeth of the gear as the same is moved into the gear-receiving recess, and means for forcing the clamping members toward the axis of the gear-receiving recess into engagement with opposing faces of said teeth, substantially as and for the purpose specified.

3. In a chuck for centering and holding gears, a body having a gear-receiving recess extending inwardly from one end thereof and formed with a circumferential wall having a cylindrical inner face, independently movable clamping members, means for holding said members in their initial position with portions thereof projecting beyond the cylindrical face into the recess in position to enter the spaces between the teeth of the gear as the same is moved axially into the gear-receiving recess, and means for simultaneously forcing the clamping members toward the axis of the gear-receiving recess into engagement with opposing faces of said teeth, substantially as and for the purpose set forth.

4. In a chuck for centering and holding gears, a body having a gear-receiving recess, independently movable clamping members, yielding means for holding said members with portions thereof projecting into said recess in position to enter the spaces between the teeth of the gear as the same is moved axially into the gear-receiving recess, and means for simultaneously forcing the clamping members toward the axis of the gear-receiving recess into engagement with opposing faces of said teeth, substantially as and for the purpose described.

5. In a chuck for centering and holding gears, a body having a gear-receiving recess and a plurality of sockets opening from the recess, independently movable clamping members, means removably mounted in the sockets and holding said members in their initial position with portions thereof projecting into said recess in position to enter the spaces between the teeth of the gear as the same is movable into the gear-receiving recess, and means for forcing the clamping members toward the axis of the gear-receiving recess into engagement with opposing faces of said teeth, substantially as and for the purpose specified.

6. In a chuck for centering and holding gears, a body having a gear-receiving recess extending inwardly from one end thereof, the body having sockets extending inwardly from the inner end wall of the recess, independently movable clamping members, yielding means mounted in the sockets and holding said members in their initial position with portions thereof projecting into said recess in position to enter the spaces between the teeth of the gear as the same is moved axially into the gear-receiving recess, and means for simultaneously forcing the clamping members toward the axis of the gear-receiving recess into engagement with opposing faces of said teeth, substantially as and for the purpose set forth.

7. In a chuck for centering and holding gears, a body having a gear-receiving recess extending inwardly from one end thereof and formed with a circumferential wall having a cylindrical inner face, said body also having sockets extending from the inner end wall of the recess in a direction substantially parallel to the axis of said recess, independently movable clamping balls, yielding stems having corresponding ends slidably mounted in the sockets and their other ends projecting into the recess and connected to the clamping balls, said stems holding the clamping balls in their initial position with portions thereof projecting beyond the cylindrical face into the recess in position to enter the spaces between the teeth of the gear as the same is moved axially into the gear-receiving recess, and means for simultaneously forcing the clamping members toward the axis of the gear-receiving recess into engagement with opposing faces of said teeth, substantially as and for the purpose described.

8. A chuck for centering and holding gears comprising a body, and independently-movable clamping members having spring stems supported by the body, the clamping members for entering between and engaging opposing faces of teeth of the gear held by the chuck, and said body including elements having diverging bearing faces for the clamping members, each element having one of said bearing faces which is opposed to the bearing face of the other element, said elements having relative movement for simultaneously moving said faces toward each other and thereby forcing the clamping members into engagement with opposing faces of said teeth, substantially as and for the purpose described.

9. A chuck for centering and holding gears comprising a body having a circular series of sockets, and clamping members for entering between and engaging opposing faces of teeth of the gear held by the chuck, said clamping members being provided with spring stems having their ends located in the sockets, and said body including elements having relative movement for forcing the clamping members relatively to the axis of the chuck, substantially as and for the purpose set forth.

10. A chuck for centering and holding gears comprising a body having a circular series of sockets, and clamping members for engaging opposing faces of teeth of the gear held by the chuck, said clamping members being provided with spring stems having their ends located in the sockets and slidably engaging the walls of the sockets for permitting the stems to move lengthwise, and said body including elements having relative movement for forcing the clamping members relatively to the axis of the chuck, substantially as and for the purpose specified.

11. A chuck for centering and holding gears comprising a body having a circular series of sockets, and clamping members consisting of balls, the balls having openings therein and spring stems extending into the openings of the balls and also into the sockets, and said body including elements formed with diverging bearing faces for the balls and having relative movement for forcing the balls relatively to the axis of the chuck, substantially as and for the purpose described.

In testimony whereof, I have hereunto signed my name in the presence of two attesting witnesses, at Syracuse, in the county of Onondaga, in the State of New York, this 5th day of February, 1908.

GEORGE W. SPONABLE.

Witnesses:
C. A. LAWLON,
CHAS. H. YOUNG.